United States Patent
Kurschner

[15] 3,656,830
[45] Apr. 18, 1972

[54] REAR VIEW MIRROR WITH MOISTURE CONTROL

[72] Inventor: Gustav Kurschner, Fechenbach (Main), Germany

[73] Assignee: Fechenbacher Armaturen-Und Metallwaren-Fabrik, Fechenbach am Main, Germany

[22] Filed: Aug. 20, 1970

[21] Appl. No.: 65,379

[30] Foreign Application Priority Data

Aug. 20, 1969 Germany..................G 69 32 782.8

[52] U.S. Cl..............................................350/67, 350/288
[51] Int. Cl...................................................G02b
[58] Field of Search..................350/67, 288, 310; 285/80

[56] References Cited

UNITED STATES PATENTS 3,551,020  12/1970  Cowan et al.......................350/67
2,202,697  5/1940   Hodny.................................350/67
3,445,151  5/1969   Stefanakis............................350/67

FOREIGN PATENTS OR APPLICATIONS 186,868  10/1922  Great Britain.........................350/67

Primary Examiner—David Schonberg
Assistant Examiner—Robert L. Sherman
Attorney—Michael S. Striker

[57] ABSTRACT

In an external rear view mirror a cupped housing has an open side in which a mirror member is retained, with an annular sealing ring being interposed between the mirror member and the housing. The sealing ring has a main annular body portion and an axially adjacent annular sealing lip extending along the main annular body portion with both of them together having a circumferential edge face provided with a plurality of circumferentially distributed at least substantially radial kerfs which extend through the radial thickness of the sealing lip but only partly through the radial thickness of the main body portion.

10 Claims, 5 Drawing Figures

PATENTED APR 18 1972 3,656,830

Inventor
GUSTAV KURSCHNER

REAR VIEW MIRROR WITH MOISTURE CONTROL

BACKGROUND OF THE INVENTION

The present invention relates generally to rear view mirrors such as for automotive vehicles and the like, and more particularly to external rear view mirrors. Still more particularly the present invention relates to a sealing ring for use in an external rear view mirror.

External rear view mirrors of the type under discussion utilize a cupped housing in the open side of which the actual mirror member is mounted. Interposed between the housing and the mirror member, mounting the latter in the former, is a sealing ring the purpose of which is not only to elastically retain the mirror member in the housing, but also to provide a seal between the mirror member and the housing to thereby seal the interior of the housing against the intrusion of moisture and the like. It has been found, however, that it is rarely possible to obtain absolute seal-tightness, especially in view of the temperature fluctuations to which the various components are subjected with concomitant differential thermal expansion and contraction, so that the possibility almost always exists for moisture such as water to intrude into the interior of the housing and, for instance under the influence of underpressure, to retain therein for substantial periods of time. This, of course, leads to damage to the mirror, especially to the reflecting coating of the mirror member.

SUMMARY OF THE INVENTION

It is, accordingly, an object of the present invention to overcome these disadvantages.

More particularly it is an object of the present invention to provide, in an external rear view mirror construction, an improved sealing ring which avoids these disadvantages.

In pursuance of the above objects, and others which will become apparent hereafter, one feature of the invention recites, briefly stated, in an external rear view mirror comprising a cupped housing having an open side, a mirror member retained in the open side, and an annular sealing ring sealingly interposed between the mirror member and the housing. The sealing ring has a main annular body portion and an axially adjacent annular sealing lip extending along the same with both having a circumferential edge face. A plurality of circumferentially distributed at least substantially radial kerfs is provided in the aforementioned edge face and extend into the sealing lip and into the main body portion.

The purpose of this novel construction is to assure that water which does manage to intrude into the interior of the housing will be either dried out by ventilation, or else can flow out again without being retained in the housing, thus eliminating any danger of damage to the mirror construction, particularly the reflective coating on the mirror member.

According to one embodiment of the invention the kerfs which extend at least substantially radially with respect to the annular sealing ring, which extend from one to the other opposite axial end thereof, are provided only over a portion of the circumference of the sealing ring, preferably the lowermost portion of the circumference as seen with reference to the orientation in which the sealing ring is installed in the mirror. In this construction it is preferable that the sealing ring provide a complete seal at certain circumferential locations, for instance at the top and at the sides while any water which does manage to enter into the interior of the housing can always leave at once by the preferably downwardly directed kerfs in the lower portion of the sealing ring circumference.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
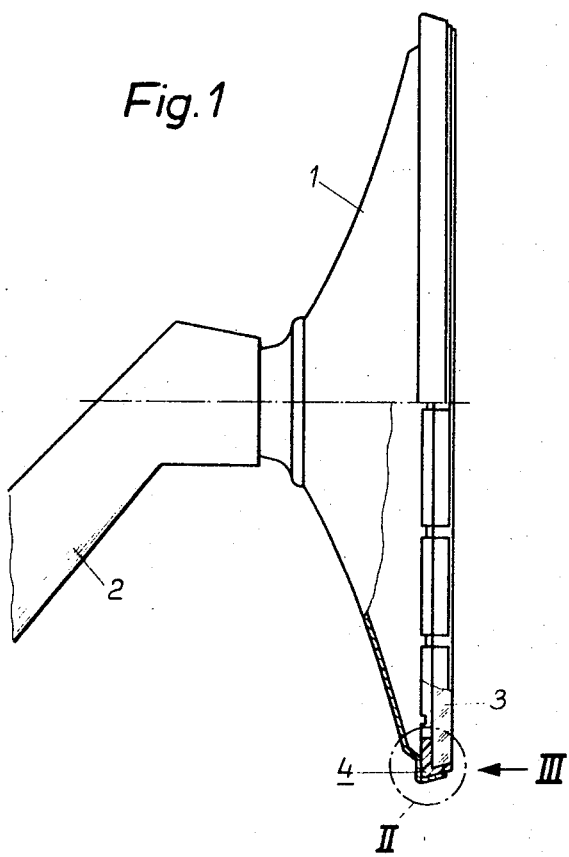
FIG. 1 is a partially sectioned, partially broken away side-elevational view of a rear view mirror embodying the invention.

Discussing now the drawing in detail it will be seen that reference numeral 1 identifies a cupped mirror housing mounted on a support 2. The particular configuration of support 2 and of the housing 1 is of no importance for purposes of the present invention. Mounted in the open side of the housing 1 is the actual mirror member 3 which is retained in a sealing ring 4 according to the present invention.

Figure 2:
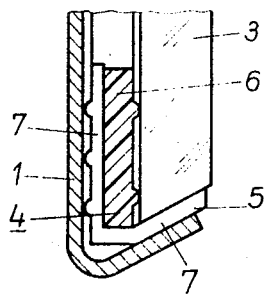
FIG. 2 is a fragmentary enlarged section of the portion outlined in FIG. 1 by the chain-line circle X.

As FIG. 2 shows, the outer edge of the housing 1 at the open side of the latter surrounds the annular sealing ring 4 at the periphery of the latter, and at the lip 5 thereof. The sealing ring 4 is composed of the lip 5 and, axially adjacent thereto and similarly of annular outline, of the main body portion 6. The two are usually of one piece with one another as will be appreciated. The main body portion 6 is accommodated between the inner concealed side of the mirror member 3 and the housing 1 whereas the lip 5 surrounds and retains the mirror member 3.

According to the present invention the outer circumferential edge face of the sealing ring 4 is provided with a plurality of kerfs 7 which extend from one to the other axial end of the sealing ring composed of the sections 5 and 6, and which extend inwardly from the outer circumferential edge face at least substantially radially with reference to the annular sealing ring. In the illustrated embodiment these kerfs 7 are provided in the manner shown by way of example in FIG. 3 where the open side of the housing and the mirror member, as well as accordingly the sealing ring 4, are for purposes of explanation assumed to be of completely circular outline. Of course, the particular outline is of no consequence and the invention will be equally applicable irrespective of the particular outline, that is whether it be circular or other-than circular. In fact, particularly if the outline is non-circular where a preferred direction is more or less dictated by the configuration, it is advantageous to provide the grooves or kerfs 7 only over a certain portion of the circumference, preferably the downwardly directed portion.

Figure 3:
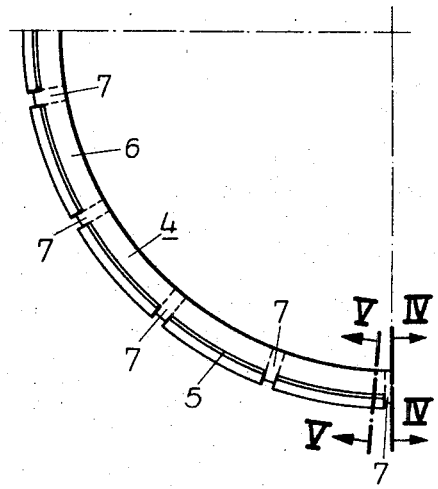
FIG. 3 is a fragmentary end-elevational view of FIG. 1, seen in the direction of the arrow Y therein.
Figure 4:
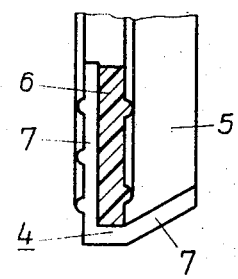
FIG. 4 is a section on an enlarged scale taken on line IV—IV in FIG. 3.
Figure 5:
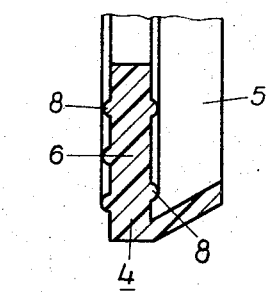
FIG. 5 is another section similar to FIG. 4 but taken on line V—V of FIG. 3.

FIG. 4 is a section taken on the line IV—IV of FIG. 3 and illustrates the cross-section through which one of the kerfs 7 is taken. It is clear that the kerf 7 extends all the way through the sealing lip 5, that is all the way through the radial thickness of the latter, whereas the kerf extends only partly through the radial thickness of the main body portion 6. FIG. 5 is a view similar to FIG. 4 but taken on the line V—V to show the cross-section of the sealing ring 4 at a location where the section does not pass through one of the kerfs 7; a comparison between FIGS. 4 and 5 clearly indicates that the kerf 7 extends all the way through the radial thickness of the sealing lip 5. However, it is emphasized that this need by no means be the case and that the kerfs 7 could for instance extend only part way through the thickness of the sealing lip 5, it being understood that they must of course never pass all the way through the radial thickness of the main body portion 6 unless there is a specific reason for so doing, for instance unless it is necessary for some reason to have the sealing ring or the body portion 6 be circumferentially discontinuous, but this will not ordinarily be the case. It is also possible, of course, for the sealing lip 5 to have the same or substantially the same radial thickness as the main body portion 6, but this again is not ordinarily the preferred construction.

Reference numeral 8 identifies projections on the main body portion 6 which in known manner reduce the forces exerting pressure upon the mirror member 3. It is preferable that the sealing ring according to the present invention be at least predominantly composed of synthetic plastic material, for which purpose many synthetic elastomers are known, including polyethylene to just name one example. However, the sealing ring can also be made of any other suitable material ordinarily used for sealing rings of this type, such as rubber.

It will be understood that each of the elements described above, or two or more together, may also find a useful application in other types of constructions differing from the types described above.

While the invention has been illustrated and described as embodied in an external rear view mirror sealing ring, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In an external rear view mirror, in combination, a cupped housing having an open side; a mirror member retained in said open side; and an annular retaining ring interposed between said mirror member and said housing, said retaining ring having a main annular body portion and an axially adjacent annular lip extending along the same and both having a circumferential edge face, and a plurality of circumferentially distributed at least substantially radial kerfs provided in said edge face and extending into said lip and said main body portion in communication with the interior of said housing and with the ambient atmosphere, whereby the interior of said housing is ventilated so as to prevent the accumulation and retention of moisture therein.

2. In a rear view mirror as defined in claim 1, wherein said sealing lip has a thickness in direction radially of said ring which is smaller than that of said main body portion; and wherein said kerfs extend all the way through said lip but only partly through said main body portion.

3. In a rear view mirror as defined in claim 1, said ring having a predetermined axial length, and said kerfs extending axially of said ring over the entire axial length thereof.

4. In a rear view mirror as defined in claim 1, said kerfs being provided only in a portion of the circumference of said ring.

5. In a rear view mirror as defined in claim 1, said ring being composed at least predominantly of elastomeric material.

6. In a rear view mirror as defined in claim 5, wherein said material is a synthetic plastic material.

7. In a rear view mirror as defined in claim 6, wherein said material is polyethylene.

8. In a rear view mirror as defined in claim 5, wherein said material is rubber.

9. In a rear view mirror as defined in claim 1, wherein said ring is of circular outline.

10. In a rear view mirror as defined in claim 1, wherein said ring is of other-than circular outline.

* * * * *

UNITED STATES PATENT OFFICE
CERTIFICATE OF CORRECTION

Patent No. 3,656,830　　　　　　　　Dated April 18, 1972

Inventor(s) Gustav Kuerschner

It is certified that error appears in the above-identified patent and that said Letters Patent are hereby corrected as shown below:

On the cover sheet [72] the inventor's name "Gustav Kurschner" should read -- Gustav Kuerschner --; [73] the assignee's name "Fechenbacher Armaturen-Und Metall-Warenfabrik" should read -- Fechenbacher Armaturen-Und Metallwarenfabrik Hohe KG --.

Signed and sealed this 12th day of December 1972.

(SEAL)
Attest:

EDWARD M. FLETCHER, JR.　　　　　　　ROBERT GOTTSCHALK
Attesting Officer　　　　　　　　　　Commissioner of Patents